(12) United States Patent
Otto

(10) Patent No.: US 6,793,857 B2
(45) Date of Patent: Sep. 21, 2004

(54) METHOD FOR PRODUCING A ONE- OR MULTIDIMENSIONAL DETECTOR ARRAY

(75) Inventor: Walter Otto, Pretzfeld (DE)

(73) Assignee: Siemens Aktiengesellschaft, Munich (DE)

( * ) Notice: Subject to any disclaimer, the term of this patent is extended or adjusted under 35 U.S.C. 154(b) by 272 days.

(21) Appl. No.: 09/985,563

(22) Filed: Nov. 5, 2001

(65) Prior Publication Data

US 2002/0054954 A1 May 9, 2002

(30) Foreign Application Priority Data

Nov. 3, 2000 (DE) .......................................... 100 54 678

(51) Int. Cl.⁷ .............................................. B32B 31/18
(52) U.S. Cl. ........................ 264/157; 264/160; 427/65; 156/67; 156/268; 250/370.11
(58) Field of Search ................................ 156/153, 154, 156/268, 250, 67, 267; 250/909, 367, 368, 370.09, 370.11, 371, 395; 378/19, 98.8; 427/65; 264/138, 139, 157, 160

(56) References Cited

U.S. PATENT DOCUMENTS

| | | | |
|---|---|---|---|
| 3,507,734 A | | 4/1970 | Ruderman |
| 3,936,645 A | * | 2/1976 | Iversen ................... 250/370.11 |
| 5,179,284 A | * | 1/1993 | Kingsley et al. ........ 250/370.11 |
| 5,296,163 A | | 3/1994 | Leppert et al. |
| 5,391,879 A | * | 2/1995 | Tran et al. .................. 250/367 |
| 5,440,129 A | | 8/1995 | Schmidt |
| 6,007,886 A | * | 12/1999 | Takigami ..................... 428/43 |
| 6,143,119 A | * | 11/2000 | Seidner ....................... 156/257 |
| 6,245,184 B1 | * | 6/2001 | Riedner et al. ............. 156/247 |
| 6,373,061 B1 | * | 4/2002 | Deutscher ................... 250/367 |

FOREIGN PATENT DOCUMENTS

| | | |
|---|---|---|
| DE | 198 42 947 A1 | 3/2000 |
| EP | 0 819 406 A1 | 1/1998 |

* cited by examiner

Primary Examiner—Gladys J P Corcoran
(74) Attorney, Agent, or Firm—Young & Thompson

(57) ABSTRACT

In order to produce a one- or multidimensional detector array (9; 15, 17; 70) for detecting electromagnetic radiation, in particular for detecting X-rays, a layer composite (1) is produced. The latter has a sensor layer (3) with a material (M) sensitive to the radiation, and a carrier layer (5). In order to subdivide the sensor layer (3) into individual elements (E11, E12, ... E1m, E21, ... Enm) that are isolated from one another, separating spaces (7) are introduced into the sensor layer (3) by material (M) being removed. Preferably, a reflector material (R) is introduced or filled into the separating spaces (7). In order to produce a plurality of one-dimensional detector arrays (70), a structure of elements (E11, E12, ... E1m, E21, ... Enm) arranged in a matrix-like manner, which structure is produced by the separating spaces (7) is broken down into row portions (52, 53, ... 63) or into column portions.

11 Claims, 4 Drawing Sheets

METHOD FOR PRODUCING A ONE- OR MULTIDIMENSIONAL DETECTOR ARRAY

BACKGROUND OF THE INVENTION

The invention relates to a method for producing a one- or multidimensional detector array for detecting electromagnetic radiation, in particular for detecting X-rays.

DESCRIPTION OF THE RELATED ART

For computer tomograph apparatuses or for other apparatuses in which X-rays or other high-energy radiation has to be detected using detectors, luminescent or scintillator materials are used which transfer the X-rays or high-energy radiation into other electromagnetic radiation whose spectral region is accessible to the human eye or a photoelectric receiver. Such a scintillator material, a so-called UFC ceramic (Ultra-Fast Ceramic), is described for example in U.S. Pat. No. 5,296,163.

Detectors which are structured in at least one direction are required for obtaining a spatial resolution of the X-ray signal.

For faster image processing and for reasons of improved utilization of the pencil of rays radiated by an X-ray source, it is also known to design an X-ray detector in such a way that it is structured along two mutually perpendicular axes, thereby forming a two-dimensional detector array. Such two-dimensional arrays are disclosed for example in U.S. Pat. No. 5,440,129 and EP 0 819 406 A1.

Producing one- or multidimensional detector arrays with luminescent or scintillation material is costly and causes a high manufacturing outlay, in particular in the case of production in high numbers.

SUMMARY OF THE INVENTION

The invention is based on the object of specifying a production method for detector arrays for detecting electromagnetic radiation which makes it possible to produce such detector arrays with a low outlay.

With a method of the type mentioned in the introduction, this object is achieved according to the invention by virtue of the fact that
a) a layer composite is produced, which has a sensor layer with a material sensitive to the radiation, and a carrier layer, and
b) that in order to subdivide the sensor layer into individual elements isolated from one another—separating spaces are introduced into the sensor layer proceeding from that side of the layer composite which is opposite to the carrier layer, by material being removed.

The method can advantageously be carried out in a simple manner in terms of manufacturing technology. The separating spaces can be produced as channels, troughs or grooves, in particular projecting into the carrier layer. They can be introduced by a machine in parallel with one another in rapidly succeeding work steps. It is not necessary to handle individual sensor elements. The separating spaces are preferably introduced by sawing, milling or erosion.

Preferably, the radiation-sensitive material used is a luminescent or scintillation material which is sensitive to X-rays, in particular. This makes it possible to produce an X-ray detector in a simple manner.

According to a preferred refinement, the carrier layer contains a reflector material which reflects the radiation emitted by the luminescent or scintillation material.

According to another preferred refinement, a reflector material is filled, in particular cast, into the separating spaces. It is possible, in particular, in an advantageous manner, for all the separating spaces to be filled in a single work step. The filled-in reflector material is in particular—like the material of the carrier layer—a material which reflects the radiation emitted by the luminescent or scintillation material. In this way, the elements formed by the separating spaces are optically isolated from one another and from the surroundings toward four sides and toward the rear side closed off by the carrier layer. This means that ambient light from five sides cannot penetrate into an element of the sensor layer, and that, on the other hand, luminescence light generated by the luminescent or scintillation material in the element is reflected back from five sides and is collected at the sole side remaining open, for example for coupling a photodetector. Moreover, crosstalk between the individual elements of the sensor layer is avoided by virtue of the separating spaces filled with reflector material.

According to a particularly preferred refinement, the separating spaces are introduced, in particular as mutually crossing grooves, in such a way as to form a structure of elements arranged in a matrix-like manner.

Such a matrix-like structure can be used for producing a two-dimensional detector array, the elements of the structure being used as sensor elements. For this purpose, each of the elements may be brought into contact, on its side which faces away from the carrier layer and represents the sole side that is still open when said reflector material is provided, in each case with a photoelectric receiver in particular with a photodiode. Each combination of a sensor element with a photoelectric receiver then forms a detector element which, on the output side, can be connected to an evaluation unit.

The method according to the invention also advantageously makes it possible to produce a plurality of two-dimensional detector arrays in one work step. For this purpose, the structure of elements arranged in a matrix-like manner is manufactured in an appropriate size and then broken down into a plurality of matrix-like substructures.

According to an especially preferred embodiment, the method is employed for producing a plurality of one-dimensional detector arrays. For this purpose, the structure of elements arranged in a matrix-like manner is broken down, for example sawn, into row portions or into column portions.

The row portions or column portions for producing one-dimensional detector arrays can be obtained in a number of variants:

According to a first variant, the row portions or the column portions are formed by the structure of elements arranged in a matrix-like manner being divided along a plurality of mutually parallel first separating planes which run only through the separating spaces. In this case, the separation along the separating spaces is preferably carried out in such a way that, on both sides of each separating plane, the amount of reflector material that remains is as much as is needed to shield the adjacent elements of the sensor layer.

Only when divisions are implemented along such first separating planes can the elements of the resulting column portions or row portions be used as sensor elements. They may be brought into contact, on their side which faces away from the carrier layer and is not covered by the reflector material, in each case with a photoelectric receiver, in particular with a photodiode.

According to a second variant, row portions or column portions are formed by the structure of elements arranged in a matrix-like manner being divided along a plurality of mutually parallel second separating planes which in each case run between two first separating planes and in each case separate a row or a column into a plurality of parallel row portions or column portions, respectively. The second separating planes preferably run parallel to the first separating planes.

Whereas in the first variant n row portions, for example, can be generated if the matrix-like structure has n rows, in the second variant 2n row portions are produced from a structure having n rows. In the second variant, it is expedient, therefore, for the height of the rows (in the column direction) to be chosen to be correspondingly larger.

Preferably, in the second variant, before the process of splitting into row portions or into column portions, a covering layer, which preferably contains a reflector material, is applied on that side of the layer composite which is opposite to the carrier layer.

In this way, the sensor elements produced in accordance with the second variant are also shielded toward five spatial directions.

In the second variant, an open, unshielded side remains in the sensor elements, in particular on the second separating planes. The row portions or column portions produced according to the second variant are therefore preferably used with their elements as sensor elements by being brought into contact, on the second separating planes, in each case with a photoelectric receiver, in particular with a photodiode.

The radiation-sensitive material is preferably a luminescent ceramic, in particular and "Ultra-Fast Ceramic" (UFC ceramic), for example one as described in U.S. Pat. No. 5,296,163, column 6, line 50, to column 8, line 32.

A diffusely reflecting or scattering material, preferably with a white color, e.g. an epoxy resin filled with titanium oxide, is preferably used for the constituents of the detector array produced that are provided with reflector material.

The detector array produced can advantageously be used for detecting X-rays in a computer tomograph. In the method variant for producing a two-dimensional detector array, the rows and columns of the produced structure of elements arranged in a matrix-like manner are then adapted in terms of their number, width and order to the so-called z-direction or ($\phi$-direction of the computer tomograph.

BRIEF DESCRIPTION OF THE DRAWINGS

Three exemplary embodiments of a production method according to the invention are explained in more detail below with reference to FIGS. 1 to 9, in which.

DESCRIPTION OF THE PREFERRED EMBODIMENTS

Figure 1:
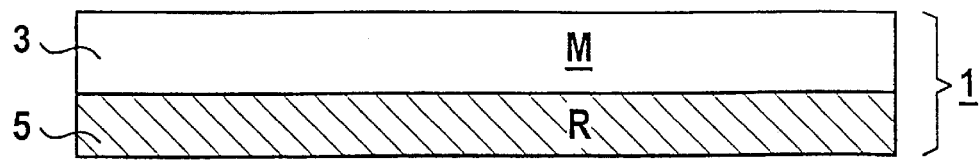
FIG. 1 shows a first method step for all three exemplary embodiments.

FIG. 1 shows a layer composite 1 comprising a one-piece, plane-parallel-lapped wafer of luminescent material or sensor layer 3 which has been provided on one side with a carrier layer 5 having a thickness of approximately 0.5 mm and containing a reflector material R. The carrier layer 5 can be effected by casting, for example by casting using an epoxy resin or synthetic resin with which white titanium oxide has been admixed as filler, by bonding on a reflective sheet or by bonding on a white ceramic material. The sensor layer 3 contains radiation-sensitive material M.

Figure 2:
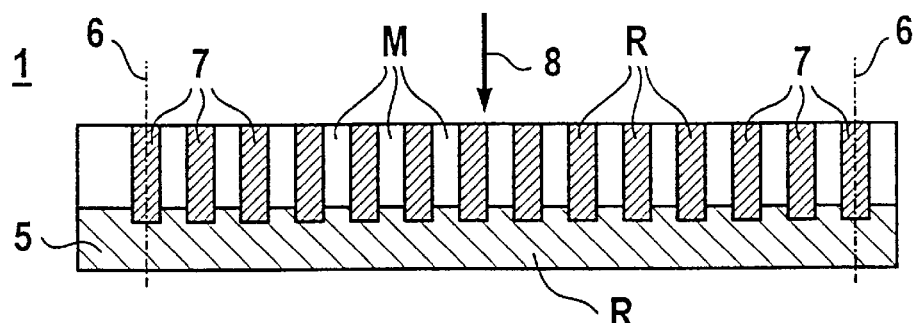
FIG. 2 shows a second method step for all three exemplary embodiments.

In a second method step illustrated in FIG. 2, the sensor layer 3 is made into a desired array structure by sawing, erosion or another removal method. As is illustrated in FIG. 2, a total of fourteen separating spaces 7 have been introduced along a direction—perpendicular to the plane of the drawing—of the layer composite 1, said separating spaces being designed as sawing slots or channels and extending into the carrier layer 5.

Moreover, further grooves or slots running perpendicularly to said first direction and crossing the grooves which can be seen in FIG. 2 are introduced into the sensor layer 3, thereby forming a structure of elements E11, E12, ... E1m, E21, ... Enm arranged in a matrix-like manner. The result of this third method step can be seen in the plan view 8 of FIG. 3.

Figure 3:
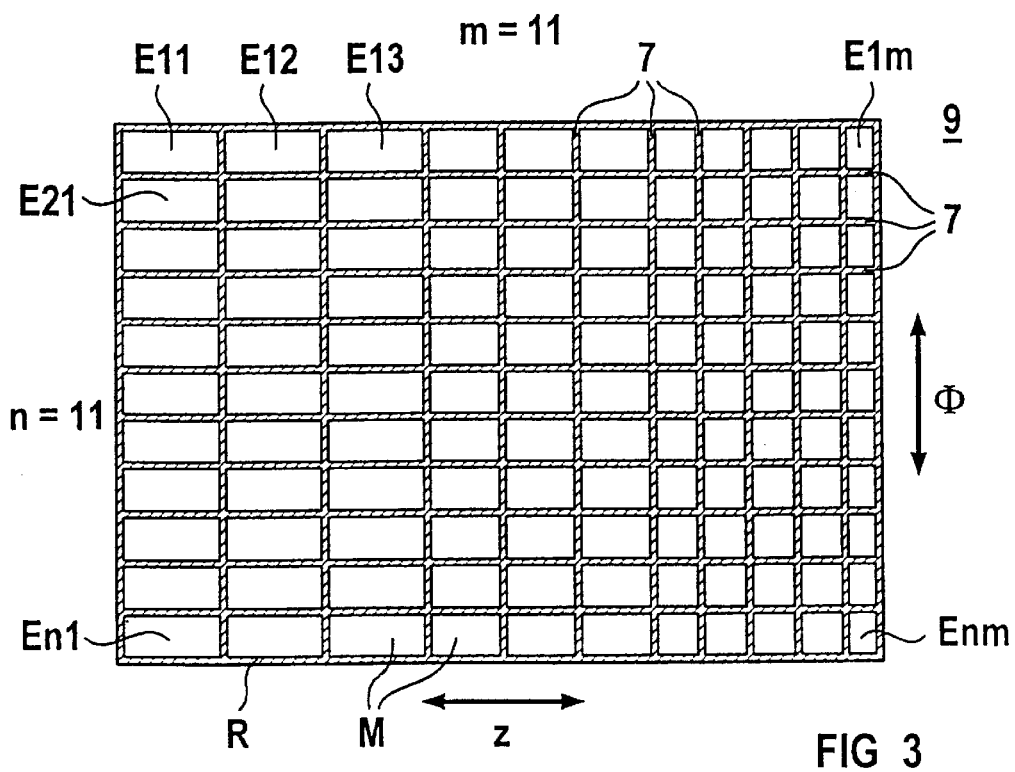
FIG. 3 shows a third method step relating to a first and a second exemplary embodiment.

Depending on the number, sequence and spacing of the channels introduced, the matrix formed has rows and columns of the same width (see FIG. 5) or rows and columns of varying width (see FIG. 3).

A filling material containing reflector material R, for example synthetic resin admixed with titanium oxide, is cast into the separating spaces 7. In this case, the amount of filling material that is cast in is enough to ensure that the channels or separating spaces 7 are overfilled, i.e. overflow, in order to take account of shrinkage of the filling material during the subsequent curing process.

As a result of the abovementioned procedure, in accordance with a first exemplary embodiment according to the invention, e.g. the two-dimensional detector array 9 illustrated in FIG. 3 in a plan view 8 of the layer composite 1 of FIG. 2 is produced. It comprises 121 elements Eij (i: row index, j: column index) having a number n=11 of rows and a number m=11 of columns. The n=11 rows are essentially equidistant and of the same width and extend—for the envisaged use in a computer tomograph—in the so-called $\phi$-direction thereof. The m=11 columns have different widths and extend in a direction provided as the z-direction for the computer tomograph.

The individual elements E11, E12, ... E1m, E21, ... Enm of the detector array 9 of FIG. 3 are enclosed toward the four spatial directions of the plane of the drawing in FIG. 3 and at the rear side by reflector material R. The enclosure by reflector material R arises in the case of the elements at the edges by virtue of the fact that separating cuts 6 were made approximately centrally through separating spaces 7 filled with reflector material R, which cuts severed material M at the edges, and in the case of which cuts sufficient reflector material R remained shielding adjacent elements.

The elements Eij are open at the top side, which can be seen in the plan view of FIG. 3. At said top side, they are ground, polished and/or lapped, with the result that excess reflector material R is also removed and a desired thickness dimension is achieved. Afterward, a photoelectric receiver (not explicitly illustrated) is in each case brought into contact at the open side of each element Eij of the detector array 9. By way of example, a photodiode array adapted to the matrix structure of the detector array 9 is applied, with the result that contact is made with all of the elements E11, E12, . . . E1m, E21, . . . Enm in one step.

The carrier layer 5 is cured and then ground down to approximately 0.3 mm.

Figure 4:
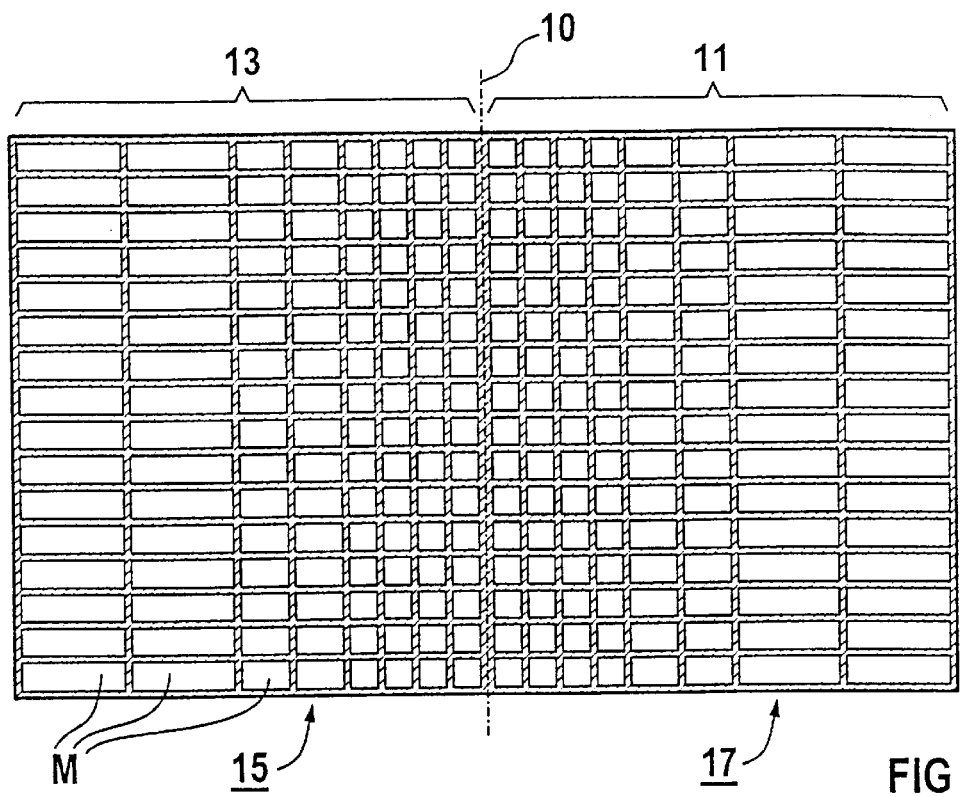
FIG. 4 shows a fourth method step relating to the second exemplary embodiment.

In the second exemplary embodiment illustrated in FIG. 4, a larger matrix structure having a larger number of elements was produced in accordance with the abovementioned steps 1–3 (FIG. 1–FIG. 3), which structure, in a fourth step, is now broken down into two matrix-like substructures 11, 13 by separation along a line 10, thereby forming a total of two two-dimensional detector arrays 15, 17.

The production method described makes it possible to produce two-dimensional detector arrays for a computer tomograph without a high outlay, it being possible for the structuring to be chosen very flexibly and implemented precisely. The methods are very cost-effective in particular for production in relatively small and medium numbers.

A third exemplary embodiment is explained below with reference to FIGS. 5 to 9. It is geared to the production of one-dimensional detector arrays.

Figure 5:
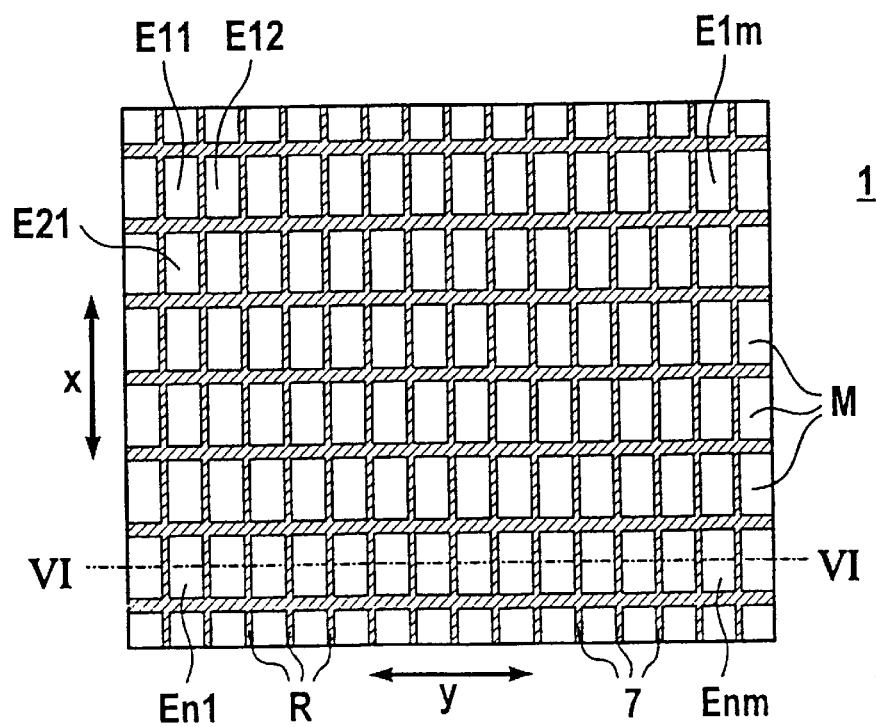
FIG. 5 shows a third method step relating to a third exemplary embodiment.

FIG. 5 illustrates in plan view 8 (FIG. 2) a structure of matrix-like elements E11, E12, . . . E1m, E21, . . . Enm, which is produced in accordance with FIGS. 1 and 2 and the abovementioned steps 1 to 3 and has eight rows and 16 columns along the matrix axes x, y. In this state, at least the inner elements E11, E12, . . . E1m, E21, . . . Enm (n=6, m=14) are optically shielded toward five spatial directions and open at the top side, which can be seen in the plan view of FIG. 5. Separating cuts as in FIG. 2 (reference symbol 6) have not yet been carried out at this stage in this example.

The casting of the separating spaces 7 in a casting mold can also be performed in such a way that the outer elements are also covered with reflector material R at the edges. All 8×16 elements would then be optically shielded toward five spatial directions.

Figure 6:
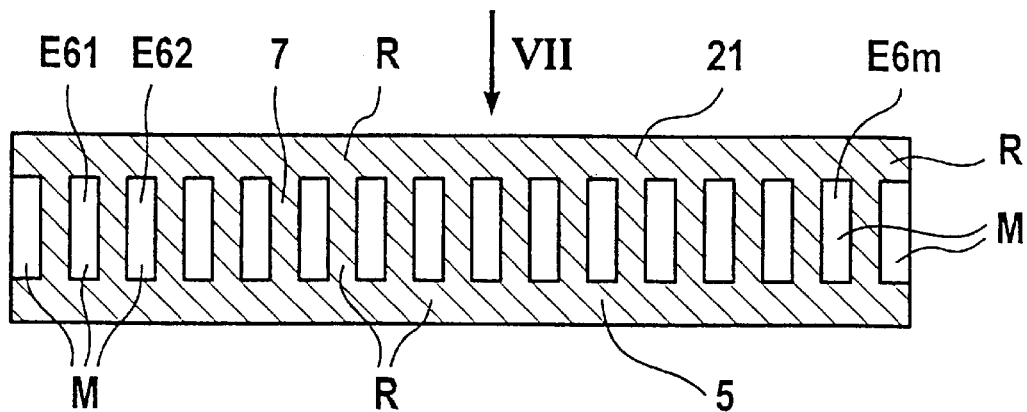
FIG. 6 shows a fourth method step relating to the third exemplary embodiment.

In a subsequent fourth step, as illustrated in FIG. 6, a covering layer 21 (thickness approximately 0.6 mm) with reflector material R is applied to the still open top side, with the result that the inner elements E11, E12, . . . E1m, E21, . . . Enm with radiation-sensitive material M are now surrounded on all sides by reflector material R. The application of the covering layer 21 can be effected in one work operation together with the filling of the separating spaces 7, by a corresponding casting resin being cast in a silicone casting mold whilst filling in the separating spaces 7 and providing the covering layer 21. After the casting process, in a post-processing step, a possible excess of reflector material R is removed and the desired thickness of approximately 0.3 mm and the desired surface quality are set by grinding or polishing.

Figure 7:
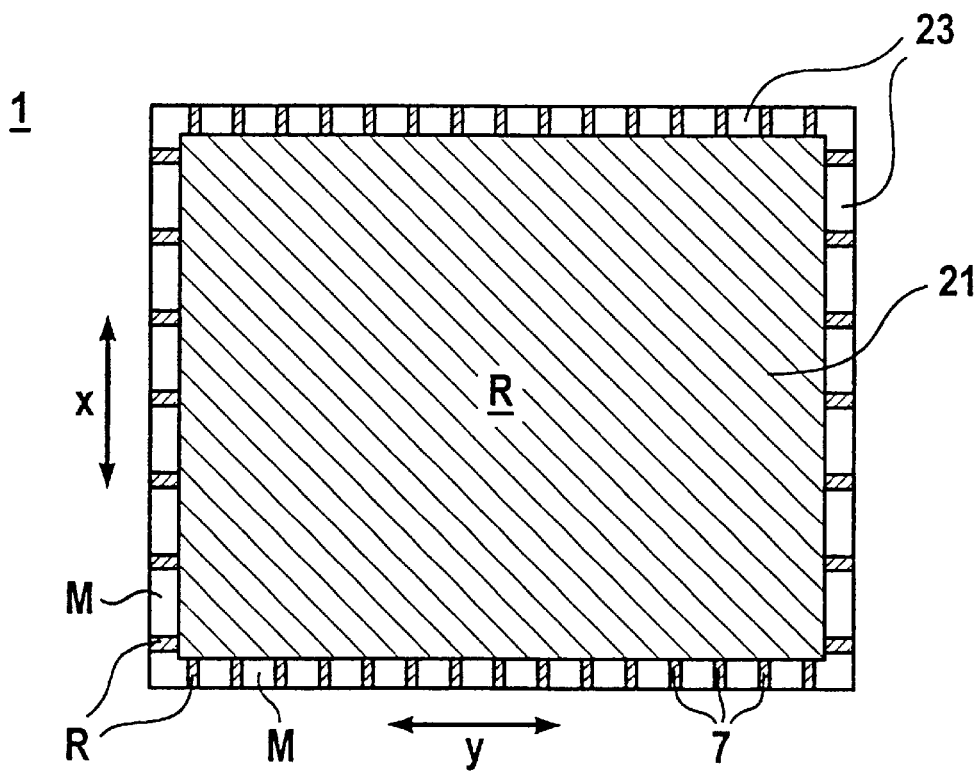
FIG. 7 shows a fifth method step relating to the third exemplary embodiment.

As illustrated in FIG. 7, the covering layer 21 is subsequently removed, in a fifth step, at the four edges in each case with the formation of an edge strip 23, with the result that the underlying matrix structure with the ends of its rows and columns becomes visible.

Figure 8:
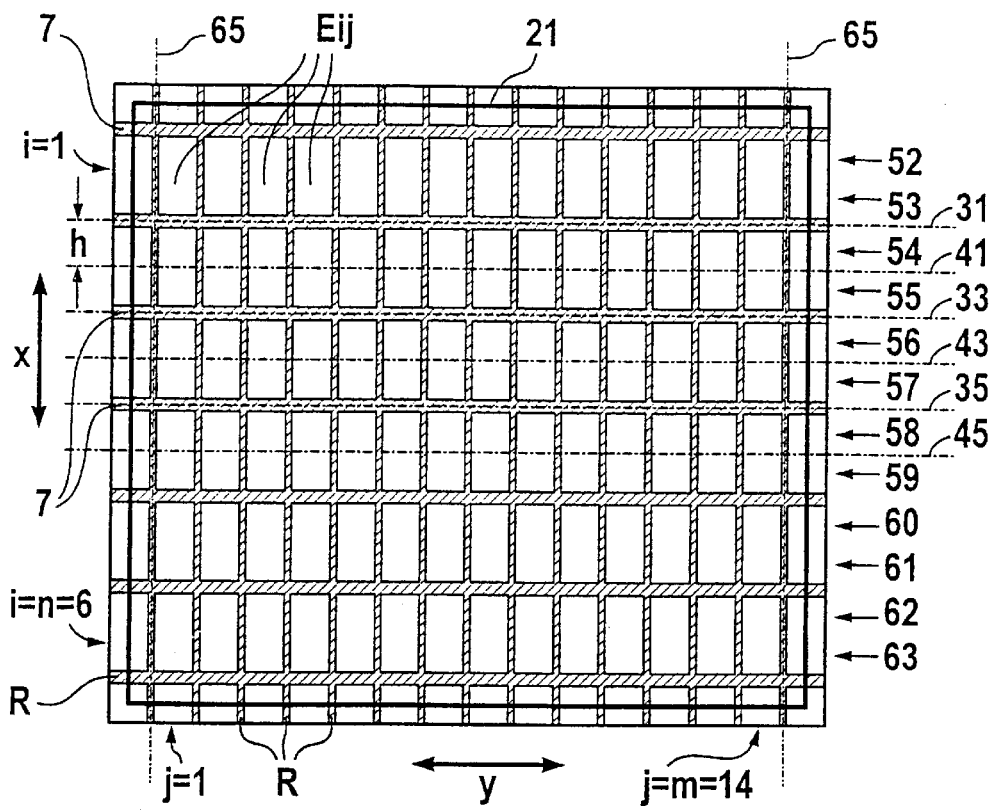
FIG. 8 shows a sixth method step relating to the third exemplary embodiment.

FIG. 8 shows how, in the subsequent sixth step, the layer composite 1 of FIG. 7 is cut up into a total of 12 row portions 52, 53 . . . 63 by being cut up in the y-direction along first separating planes 31, 33, 35 and second separating planes 41, 43 and 45. In this case, the covering layer 21 is shown transparent in order to increase the clarity. The row portions 52, 53 . . . 63 are each cut off as a contiguous individual portion, a cut being made alternately along one of the first separating planes 31, 33, 35 and along one of the second separating planes 41, 43, 45. The first separating planes 31, 33, 35 run exclusively through the separating spaces 7 and parallel to the sawn-in channels or slots. The second separating planes 41, 43, 45 are oriented parallel to the first separating planes 31, 33, 35 and lead to the division of each element E11, E12, . . . E1m, E21, . . . Enm into two parts. In other words: the inner n=6 rows are separated into 12 parallel row portions 52, 53 to 63. For this reason, the spacing of the separating spaces 7 between two rows i was chosen such that it corresponds approximately to twice the possible height h of a sensor element, the cut width of the second separating planes 41, 43, 45 and the width of the separating spaces 7 having been taken into account.

The first separating planes 31, 33, 35 are led along the separating spaces 7 in such a way that sufficient reflector material R for shielding the adjacent sensor elements produced still remains on both sides. The second separating planes 41, 43, 45 cut through the elements E11, E12, . . . E1m, E21, . . . Enm centrally. The cuts along these second separating planes 41, 43, 45 result in the advantage that the luminescent-material pixels or sensor elements produced have a precise surface with chipping-free edges, since the radiation-sensitive material M, in the separating plane, is protected on all sides by reflector material R.

Before the process of cutting up in the y-direction, separations are performed in the x-direction along lines 65, running parallel to and in separating spaces 7, in such a way that the ends of the layer composite 1 still remain covered with reflector material R.

Figure 9:
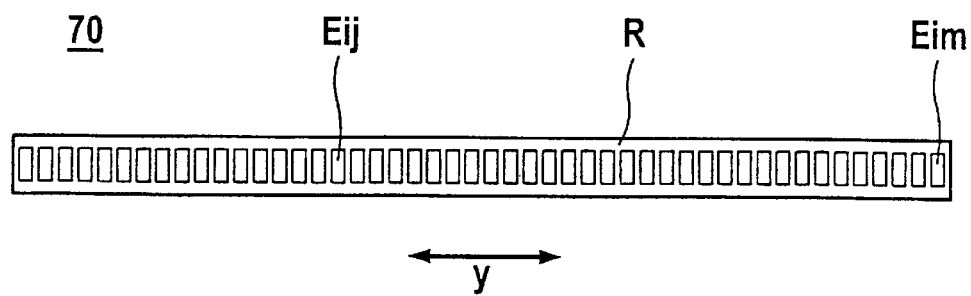
FIG. 9 shows a one-dimensional detector array produced according to the third exemplary embodiment.

The method makes it possible to produce, in a time-saving manner, a plurality of one-dimensional detector arrays 70, one of which is illustrated in FIG. 9 (m=48). It is not necessary to handle individual pixels or pixel rows. The desired array structures can be produced with a precision of about +/−0.010 mm. The one-dimensional detector array 70 of FIG. 9 is surrounded by reflector material R on five sides and is optically accessible only at the front side, which can be seen in this view and corresponds to the second separating planes 41, 43, 45 in FIG. 8. At this front side, the one-dimensional detector array 70 produced as a row portion can be contact-connected to a row of photoelectric receivers, in particular to a photodiode row.

What is claimed is:

1. A method for producing a plurality of one-dimensional detector arrays (70) for detecting electromagnetic radiation, a) wherein a layer composite (1) is produced, which has a sensor layer (3) with a material (M) sensitive to the electromagnetic radiation, and a carrier layer (5), b) wherein—in order to subdivide the sensor layer (3) into individual elements (E11, E12, . . . E1m, E21, . . . Enm) isolated from one another—separating spaces (7) are introduced into the sensor layer (3) proceeding from that side of the layer composite (1) which is opposite to the carrier layer (5), by material (M) being removed, in such a way as to form a structure of elements E11, E12, . . . E1m, E21, . . . Enm) arranged in a matrix-like manner and c) wherein the structure of elements (E11, E12, . . . E1m, E21, . . . Enm) arranged in a matrix-like manner is broken down into row portions (52, 53, . . . , 63) or into column portions thus forming a plurality of one-dimensional detector arrays (70), wherein the row portions (52, 53, ..., 63) or the column portions are formed by the structure of elements (E11, E12, ... E1m, E21, ... Enm) arranged in a matrix-like manner being divided along a plurality of mutually parallel first separating planes (31, 33, 35) which run only through the separating spaces (7), and a plurality of mutually parallel second separating planes (41, 43, 45) which in each case run between two first separating planes (31, 33, 35) and in each case separate a row (i) or a column (j) into a plurality of parallel row portions (52, 53, ..., 63) or column portions, respectively.

2. The method as claimed in claim 1, wherein the radiation-sensitive material (M) used is a luminescent or scintillation material which is sensitive to X-rays.

3. The method as claimed in claim 2, wherein the carrier layer (5) contains a reflector material (R) which reflects radiation emitted by the luminescent or scintillation material.

4. The method as claimed in claim 1, wherein a reflector material (R) is introduced or filled into the separating spaces (7).

5. The method as claimed in claim 1, wherein the separating spaces (7) are introduced as mutually crossing grooves.

6. The method as claimed in claim 1, wherein, before the process of splitting into row portions (52, 53, ..., 63) or into column portions, a covering layer (21) is applied on that side of the layer composite (1) which is opposite to the carrier layer (5).

7. The method as claimed in claim 1, wherein the elements (E11, E12, ... E1m, E21, ... Enm) of the row portions (52, 53, ..., 63) or of the column portions are used as sensor elements.

8. The method of claim 7, wherein the elements are brought into contact, on the second separating planes (41, 43, 45), in each case with a photoelectric receiver.

9. The method of claim 8, wherein the photoelectric receiver is a photodiode.

10. The method of claim 1, wherein the arrays detect X-rays.

11. The method of claim 6, wherein the covering layer contains a reflector material (R).

* * * * *